United States Patent [19]

Booth

[11] 3,788,062

[45] Jan. 29, 1974

[54] CHAIN INSPECTION AND REPAIR SYSTEM

[75] Inventor: Richard L. Booth, Munster, Ind.

[73] Assignee: S. G. Taylor Chain Company, Inc., Hammond, Ind.

[22] Filed: Sept. 21, 1972

[21] Appl. No.: 290,872

[52] U.S. Cl............................ 59/35, 29/401, 29/407
[51] Int. Cl............................................. B21l 21/00
[58] Field of Search..... 59/35, 1, 7, 11; 29/401, 407

[56] References Cited
UNITED STATES PATENTS

| | | | |
|---|---|---|---|
| 3,075,347 | 1/1963 | Bonifas | 59/7 |
| 3,099,130 | 7/1963 | Pahl | 59/7 |

Primary Examiner—Charles W. Lanham
Assistant Examiner—Gene P. Crosby
Attorney, Agent, or Firm—McDougall, Hersh and Scott

[57] ABSTRACT

A system for inspecting and repairing lengths of chain wherein various structures are located on a portable bed such as a trailer whereby the inspection and repair means can be transported from one location to another for handling of the chain at the site of the user. The equipment on the portable bed comprises an inspection table and means for removing non-standard links. A splice welding apparatus is provided for replacing individual links, and a unique heat-treating means are provided for assuring that the proper strength level is attained for new links. Additional equipment is provided for strength-testing the lengths by pulling means and also providing non-destructive testing equipment.

16 Claims, 2 Drawing Figures

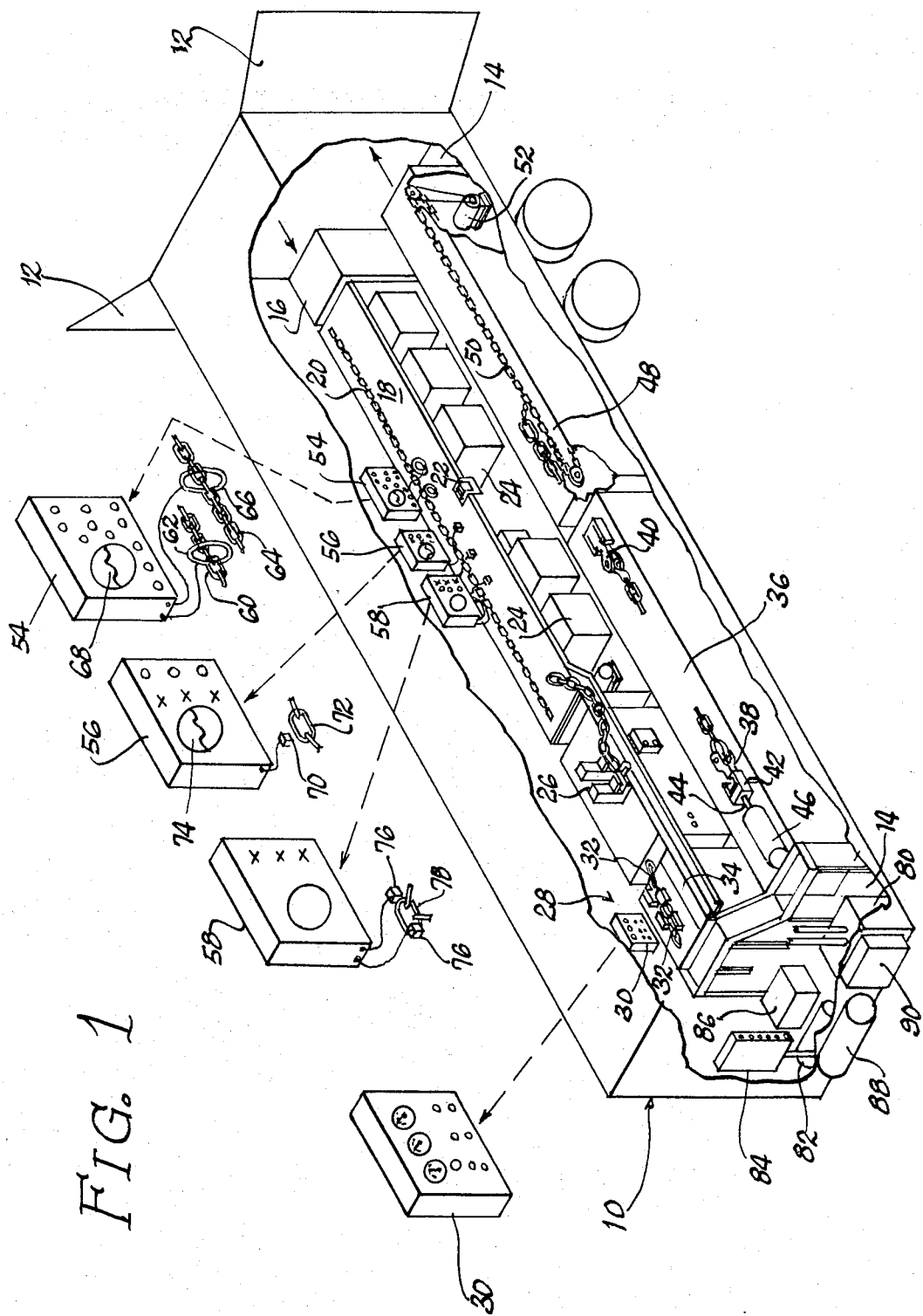

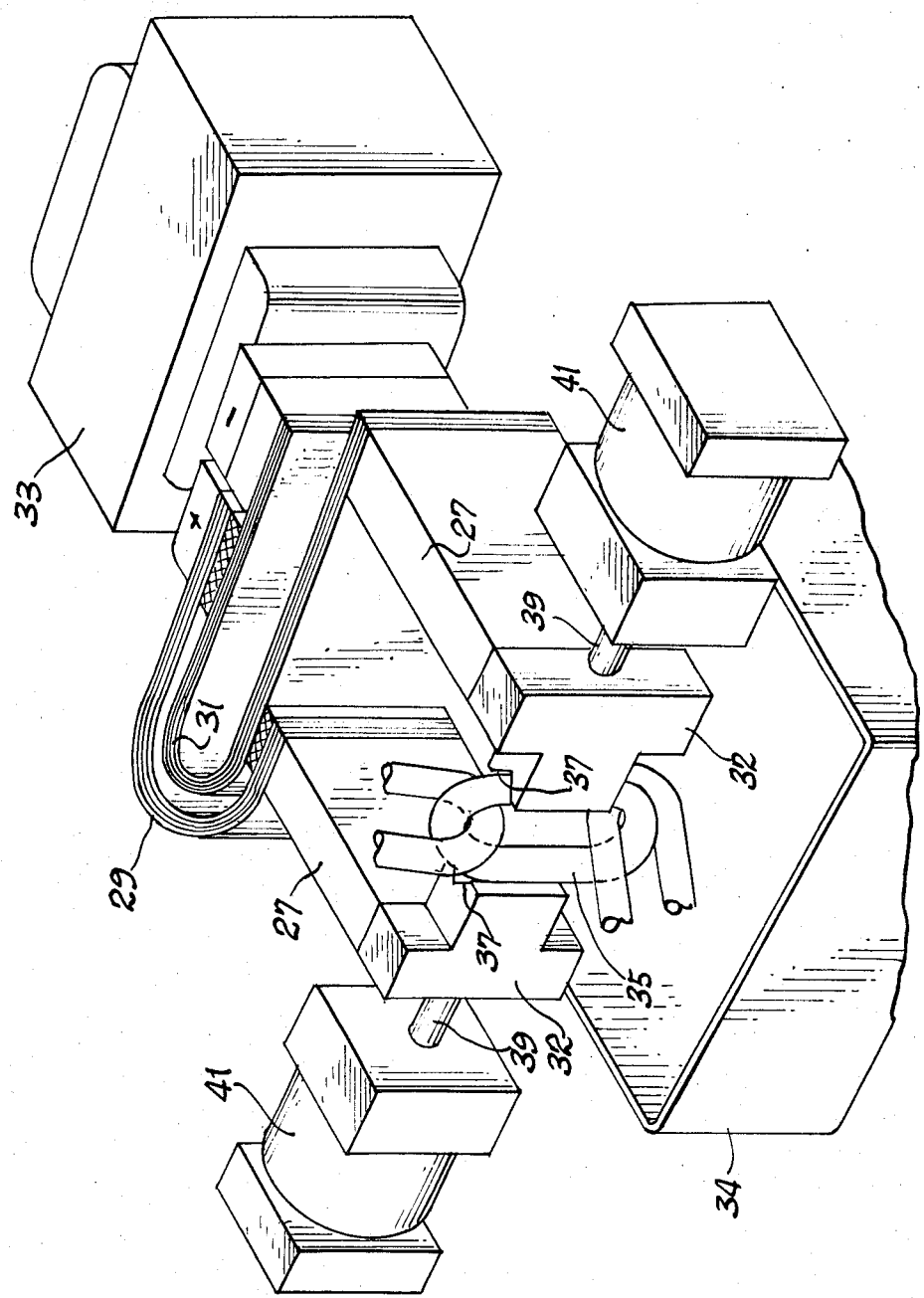

CHAIN INSPECTION AND REPAIR SYSTEM

This invention relates to a system including an apparatus and method for fast inspection and repairing of lengths of chain. The invention is particularly concerned with the handling of chain already in use by industry whereby continued use of the chain can be undertaken in safety.

Chain is utilized in industry for numerous purposes. For example, so-called sling chains are widely employed in industry for transmitting good throughout plants. Such chains are subjected to heavy loads, and it is, therefore, necessary to maintain the chains in proper condition in order to avoid down-time of the equipment. More importantly, and particularly in the case of over-head cranes, the failure of a chain during operation can lead to injury to workmen and to damage of the goods being carried as well as to structures over which the goods are being transported.

In order to reduce the likelihood of chain failure, legislation has been enacted requiring periodic inspection of chain. The inspection must be thorough enough to insure that a chain is in proper operating condition, and this requires relatively careful inspection procedures. In particular, proper inspection requires removal of the chain from the crane or other equipment in order that the chain sections can be thoroughly studied and to permit the replacement of any links which do not meet required standards.

The necessity for removing chain from equipment creates significant problems for users since a new chain must be made available so that the equipment will not have a lengthy down-time. In view of the fact that regulations require frequent chain inspection, it is ncecessary to provide substitute chains for all equipment involved, and this can lead to significant expense and inventory problems for larger industries.

It is a general object of this invention it provide an improved system for inspecting and repairing chains which overcomes the disadvantages presently experienced by industry.

It is a more specific object of this invention to provide a system employing specialized welding, heat-treating and testing equipment that will improve the quality of chain repairs while also permitting the rapid handling of the chains being repaired to minimize down-time and inventory problems in plants.

It is a further object of this invention to provide a portable chain inspection and repair system adapted to achieve the foregoing objects while also eliminating chain transportation costs to and from a chain plant and otherwise providing a highly efficient use of equipment employed in the inspection and repair operations.

These and other objects of this invention will appear hereinafter and for purposes of illustration, but not of limitation, specific embodiments of the invention are shown in the accompanying drawings in which:

FIG. 1 is a schematic perspective view illustrating a truck trailer having an inspection and repair system incorporated therewith; and, FIG. 2 is a perspective view of a single link heating means utilized in the construction.

The system of this invention generally involves the use of a portable bed for supporting a variety of pieces of equipment to be utilized in the inspection and repair of chain. The portable bed preferably comprises a wheeled vehicle such as a truck trailer whereby the bed can be transported from one location to another. In this way, the inspecting and repair equipment can be brought to the site of use of chain lengths whereby lengths can be removed from equipment, subjected to the procedure of the invention, and then returned to the equipment in a very short time. The vehicle carrying the inspection and repair equipment can be utilized for handling all chain at a given site and then moved to a new site so that maximum efficiency from the standpoint of use of the inspection and repair system is achieved.

The inspection and repair equipment of the invention is arranged on the portable bed in a manner such that maximum efficiency is achieved during use of the equipment. A visual inspection table is located adjacent the end of the bed where chain is received. This table includes a conveyor means whereby a length of chain can be drawn onto the table. Upon observance of a non-standard link, cutting means associated with the table are utilized for removing this link.

A newly replaced link is splice-welded by means of equipment mounted adjacent the inspection table, and the welded links are then heat-treated at a heat-treating station positioned adjacent the welder. This heat-treating station includes means for heat-treating a single link at a time without affecting the adjoining links or fixtures.

The equipment employed is preferably located along a U-shaped line, and the mechanisms referred to can be efficiently located along one side wall of the portable bed. A hydraulic testing machine is positioned as the first mechanism located along the opposite side wall on the opposite leg of the U. The testing machine has jaws for grasping individual lengths located in spaced relationship. A pull-test, or proof test, applying a force substantially in excess of the maximum required operating force, is then utilized for testing the strength of the chain. Once this proof-test has been passed, non-destructive testing means are employed at the next testing location for determining whether any internal defects have developed. These testing means preferably comprise a combination of units which employ different approaches for non-destructive testing whereby various checks of the chain quality can be made. If desired, the testing means can be located so that they are available for use on the inspection table which is positioned adjacent the entry end of the system.

The drawing illustrates a truck trailer 10 defining a horizontally disposed bed. This trailer may be of conventional external design whereby it can be connected to a suitable tractor for transporting from place to place. It will be appreciated that other techniques for providing the structures of the invention on a portable basis can be developed within the scope of the invention.

The trailer includes rear doors 12 providing access to the interior of the trailer. The bed 14 of the trailer is utilized for supporting various equipment including a sand blast unit 16 positioned at the entry point for chain to be handled by the system. This sand blast unit is provided for alternative use when chain to be inspected is too rusty or dirty for proper handling.

An inspection table 18 is located for receiving chain from the sand blast unit as well as newly introduced chain. This inspection table is provided with an endless "come-along" conveyor chain 20 which is of particular value when heavy chain or long lengths of chain are being inspected.

The table 18 may be utilized for a link-by-link visual inspection. The links as well as hooks and end links associated with the chain will be checked for cracks or distortions, gouges and other imperfections which make links non-standard. A cutter located at 22 is associated with the table 18 so that any non-standard link can be conveniently removed.

A plurality of storage boxes 24 are positioned beneath the bed 18 or at some other convenient location whereby links, tools and other necessary equipment can be located for easy access. As will be more clearly explained, the equipment on the bed 14 is arranged in a U-shaped fashion for maximum efficiency, and the area between the legs of the U serve as an aisle whereby the storage boxes can be easily reached.

Upon replacement of a link, the chain is moved to a splice welder 26 where the chain is re-joined. The splice welder is electrically powered and must have the capacity and ability to make good welds, so that each replaced link will have welding properties at least as acceptable as the properties of the other portions of the chain.

After welding, the properties of an individual link are determined by heat-treating. The system of this invention provides a highly efficient arrangement for handling the heat-treating of individual links whereby newly added links can be safely included in a chain. The heat-treating arrangement provided at 28 includes a control console 30 having means for determining the temperature and exposure times of a particular heat-treating operation. These means preferably automatically operate the electrode supporting pistons described below.

The specific heating structure illustrated in FIG. 2 comprises electrodes 32 designed for heating the links. The electrodes are supported on conductive holders 27 which are connected, respectively, to flexible conductive bands 29 and 31. These bands are connected to transformer 33 whereby a pulsed DC current can be applied to the electrodes for purposes of heating the link 35 held by the electrodes.

The electrodes each define a V-shaped groove 37 for purposes of clamping a link 35 between the electrodes. The electrodes are each mounted on a piston 39 associated with cylinders 41 so that the electrodes can be retracted at the conclusion of the heat-treating operation.

A quench tank 34 is positioned immediately adjacent the electrodes whereby a complete heat-treating operation can be accomplished. For example, a steel alloy can be subjected to an elevated temperature recommended for hardening, quenched and then drawn with the same heating elements, all within the area illustrated and, accordingly, with great efficiency.

The chain lengths being handled are next transported to a table 36 which supports opposed jaws 38 and 40. The jaw 38 is held by a block 42 which is connected to the piston 44 of cylinder 46. The chain length to be tested is positioned between the jaws. Accordingly, retraction of the piston 44 results in the application of pulling force to the chain whereby the chain can be proof-tested. It is preferable to test the chain at levels approximately twice the requred working load limit so that safe performance will be assured. In the event of failure of any links, the chain will be returned to the table 18 and passed through the previously described sequence until the proof-test is successful.

A final inspection table 48 is positioned on the bed adjacent the strength-test table. The table 48 is also provided with a conveyor chain or "come along" 50 driven by motor 52.

The inspection on the table 48 may also be a link-by-link visual inspection as discussed with reference to the table 18.

In the preferred form of the invention, non-destructive testing mechanisms are employed in addition to the visual inspection referred to. Suitable testing mechanisms of this type comprise the magnetic comparator shown at 54, the ultrasonic testing structure shown at 56 and the magnetic particle structure shown at 58.

The magnetic comparator unit comprises a comparison test wherein a standard chain length 60 is passed through a coil 62 operating on an eddy current principle. The chain 64 being inspected is passed through a corresponding coil 66, and the oscilloscope pattern 68 illustrates any distinctions in the respective outputs of the coils. Any gross differences between the standard sample and the chain being tested would warrant removal of one or more chain links.

The ultransonic testing unit 56 operates by means of a transducer probe 70 which transmits ultrasonic waves toward each link 72 of a chain. The reaction recorded on the oscilloscope 74 can be compared with the reaction for a standard block to provide a determination of chain acceptability with regard to internal defects.

The magnetic dry powder particle unit 58 includes opposed probes 76 with links 78 being positioned therebetween. Magnetic particles disposed between the probes will arrange themselves in a concentrated pattern when a surface or subsurface defect is present. The unit 58 is particularly useful for the inspection of a link which has just been welded.

The testing units 54, 56 and 58 are illustrated in the drawing in association with the table 18. These units can just as readily be associated with the final inspection table 48. Furthermore, the probes and coils can be arranged so that non-destructive testing can be accomplished both during the initial and at the final stages of inspection.

The forward end of the trailer may include various devices for rendering the inspection and repair system as self-contained as possible. In the embodiment illustrated, a motor 80 is employed for operating a generator 82. With this arrangement, the power for the welding and heat-treating operations as well as for the testing units can be more readily controlled. Thus, with the generator, it is not necessary to relay on the power which might be available at the site of the inspection and repair operation.

A control panel 84 is also associated with the trailer. A temperature control unit 86 for the quench tank, a water tank 88, radiator 90 and other mechanisms necessary for sustaining the various operations can also be supported by the trailer.

In a typical operation, a 200 HP gasoline engine may be employed for operating a 100 KVA single phase generator. The heat-treating unit can then be a 100 KVA single phase, 220 volt unit.

The system illustrated provides industry with a highly efficient means for achieving chain inspection on a regular basis without undue expense. The system described can be transported from site to site so that the components thereof can be continuously utilized either by a single large company or by a large number of companies located in different places. A company utilizing a system of the type described need not invest in the inspection and repair equipment involved, and the company will also save in terms of a large chain inventory which would be required if it were necessary to ship chains on a regular basis to a separate inspection and repair operation.

In addition to the convenience provided by the portable features of the invention, the arrangement described provides a highly efficient location of the respective inspection and repair units. The layout of these units as devised by applicant permits the location of the units in a confined area while providing a full complement of equipment necessary for achieving adequate inspection.

It will be understood that various changes and modifications may be made in the above described system which provide the characteristics of this invention without departing for the spirit thereof particularly as defined in the following claims.

That which is claimed is:

1. A system for inspecting and repairing lengths of chain comprising a portable bed, an inspection table mounted on the bed, means for moving the chain along the table, means associated with said table for removing non-standard links from said chain, a splice welder mounted on said bed adjacent said table for rejoining said chain, a single link heat-treating means mounted on said bed adjacent said welder, a proof-testing apparatus on said bed adjacent said heat-treating means, and chain link non-destructive testing means mounted on said bed adjacent said proof-testing apparatus.

2. A system in accordance with claim 1 wherein said non-destructive testing means are positioned for access when said chain lengths are positioned on said inspection table whereby said lengths are subjected to non-destructive testing at the beginning and at the end of said system.

3. A system in accordance with claim 2 including a separate table at the end of said system, and including chain conveyor means associated with said inspection table and with said separate table for moving the chain lengths onto and across said tables.

4. A construction in accordance with claim 1 wherein said portable bed comprises the bed of a wheeled vehicle whereby the system can be transported from one location to another for the inspection and repair of chains.

5. A construction in accordance with claim 1 including sand-blast means positioned on said bed for cleaning of the chain prior to location of the chain on said inspection table.

6. A system in accordance with claim 1 wherein said heat-treating means comprises electrical heating means, and including a quench tank positioned on said bed adjacent said heating means for quenching of individual links after heating.

7. A system in accordance with claim 6 including control means associated with said heating means for controlling the exposure time and temperature of heating.

8. A system in accordance with claim 6 wherein said heat-treating means comprises a pair of electrodes, means for movably supporting at least one of said electrodes, jaws defined by said electrodes for engaging a single link between the electrodes, said means for moving said electrodes providing for gripping of a single link in said jaws, and means for applying an electrical current to said electrodes for thereby heating said single link.

9. A system in accordance with claim 1 wherein said proof-testing apparatus comprises means for grasping spaced-apart portions of chain lengths, and means for pulling the chain lengths between said grasping means to expose the chain lengths to loads in excess of the maximum required working load for the chain lengths.

10. A system in accordance with claim 1 wherein said non-destructive testing means comprise magnetic comparision testing means for testing individual chain links.

11. A system in accordance with claim 1 wherein said non-destructuve testing means comprise a transducer probe for exposing individual chain links to ultrasonic waves, and means for measuring the reaction of the links to such waves.

12. A system in accordance with claim 1 wherein said non-destructive testing means comprise magnetic particle testing means including electrical probes for developing a magnetic field around individual chain links and attachments.

13. A method for inspecting and repairing lengths of chain comprising the steps of providing a portable bed, locating an inspection table on said bed for non-destructive testing of the chain lengths, removing non-standard links from said chain, providing a splice welding appartus on said bed and rejoining said chain with new links, providing an individual chain link heat-treating apparatus on said bed, heat-treating newly added chain lengths, providing a strength testing apparatus on said bed and applying pulling force to lengths of said chain in excess of the maximum required working load for the chain.

14. A method in accordance with claim 13 including the step of providing sand-blasting means on said bed and cleaning said chain prior to said non-destructive testing.

15. A method in accordance with claim 13 including the step of locating non-destructive testing means on said bed for testing of said chain lengths before and after said heat-treating and strength-testing operations.

16. A method in accordance with claim 13 wherein said portable bed comprises a wheeled vehicle, and including the step of transporting said vehicle to locations utilizing chain lengths whereby inspection and repair of the lengths can be carried out on the premises of the user.

* * * * *